(12) United States Patent
Burgess

(10) Patent No.: US 6,904,160 B2
(45) Date of Patent: Jun. 7, 2005

(54) METHOD FOR MATCHING GEOGRAPHIC INFORMATION WITH RECORDED IMAGES

(75) Inventor: Ken L. Burgess, Fort Collins, CO (US)

(73) Assignee: Red Hen Systems, Inc., Fort Collins, CO (US)

( * ) Notice: Subject to any disclaimer, the term of this patent is extended or adjusted under 35 U.S.C. 154(b) by 691 days.

(21) Appl. No.: 09/900,321

(22) Filed: Jul. 5, 2001

(65) Prior Publication Data

US 2002/0044690 A1 Apr. 18, 2002

Related U.S. Application Data

(60) Provisional application No. 60/241,666, filed on Oct. 18, 2000.

(51) Int. Cl.$^7$ .................................................. G06K 9/00
(52) U.S. Cl. ........................ 382/113; 382/209; 382/305; 342/25 E
(58) Field of Search ................................ 382/113, 103, 382/278, 181, 218, 209, 305; 342/357.06, 357.08, 357.12, 357.14, 25 E, 64; 701/200, 213, 226, 208, 212; 340/539.13, 268.14, 539.2, 995.12, 995.14; 386/46; 396/311; 702/3, 5; 353/5, 11; 348/231.3

(56) References Cited

U.S. PATENT DOCUMENTS

| | | | | |
|---|---|---|---|---|
| 5,204,818 A | * | 4/1993 | Landecker et al. | 701/226 |
| 5,296,884 A | * | 3/1994 | Honda et al. | 396/311 |
| 5,335,072 A | | 8/1994 | Tanaka | 348/232 |
| 5,633,946 A | * | 5/1997 | Lachinski et al. | 382/103 |
| 5,991,460 A | * | 11/1999 | Mitchell | 382/278 |
| 6,178,376 B1 | * | 1/2001 | Maquaire | 701/200 |
| 6,282,362 B1 | * | 8/2001 | Murphy et al. | 386/46 |
| 6,289,278 B1 | * | 9/2001 | Endo et al. | 701/208 |
| 6,360,168 B1 | * | 3/2002 | Shimabara | 701/211 |
| 6,366,311 B1 | * | 4/2002 | Monroe | 348/148 |
| 6,519,528 B2 | * | 2/2003 | Endo et al. | 701/211 |
| 6,597,992 B2 | * | 7/2003 | Rooney et al. | 702/5 |
| 6,701,022 B2 | * | 3/2004 | Hirao et al. | 382/253 |
| 6,731,940 B1 | * | 5/2004 | Nagendran | 455/456.1 |
| 6,782,143 B1 | * | 8/2004 | Dube et al. | 382/300 |
| 6,813,395 B1 | * | 11/2004 | Kinjo | 382/305 |
| 2001/0008564 A1 | * | 7/2001 | Hirao et al. | 382/253 |
| 2002/0011941 A1 | * | 1/2002 | Endo et al. | 340/995 |
| 2002/0029226 A1 | * | 3/2002 | Li et al. | 707/104.1 |
| 2002/0047798 A1 | * | 4/2002 | Platt | 342/357.12 |
| 2002/0047895 A1 | * | 4/2002 | Bernardo et al. | 348/48 |
| 2002/0057217 A1 | * | 5/2002 | Milnes et al. | 342/357.07 |
| 2002/0060784 A1 | * | 5/2002 | Pack et al. | 356/6 |
| 2002/0072849 A1 | * | 6/2002 | Endo et al. | 701/211 |
| 2002/0154213 A1 | * | 10/2002 | Sibyama et al. | 348/47 |
| 2003/0197626 A1 | * | 10/2003 | Endo et al. | 340/995.1 |
| 2004/0010372 A1 | * | 1/2004 | Schwoegler | 702/3 |

* cited by examiner

*Primary Examiner*—Bhavesh M. Mehta
*Assistant Examiner*—Barry Choobin
(74) *Attorney, Agent, or Firm*—Greenberg Traurig LLP; John R. Posthumus; Shelley K. Barton

(57) ABSTRACT

A method for matching a recorded image with geographic data substantially corresponding to a geographic location where the image was recorded, is disclosed. In a preferred embodiment, global positioning system data logs are time matched with other data collected, including image data, for the purpose of spatially mapping the collected data. Two important underpinnings of the present invention are that first, the real time of the data acquisition is recorded along with the data acquired; and second, that the offset time between the data logging clock and the world standard time is accurately determined. A primary advantage of the present invention is its wireless functionality; no information transmitters, receivers, special interfaces or power suppliers are required. In addition, a wide variety of off-the-shelf equipment may be used with the present invention as system components.

28 Claims, 5 Drawing Sheets

METHOD FOR MATCHING GEOGRAPHIC INFORMATION WITH RECORDED IMAGES

RELATED APPLICATION

This application claims the benefits of U.S. Provisional Application Ser. No. 60/241,666, entitled "Method for Matching Geographic Information with Recorded Images", filed Oct. 18, 2000, which is hereby incorporated by reference.

FIELD OF INVENTION

The present invention relates to an automated method for matching geographic information with recorded images, and more particularly, to a method for digitally cross-referencing information of the geographic location where and when an image is recorded, with the digital representation of the recorded image.

BACKGROUND OF INVENTION

A data collection device, such as a digital camera, is capable of recording images onto a digital storage medium. Typically, a user of a digital camera will record multiple images on the storage medium. The recorded images may be viewed by using the digital camera's viewfinder, or may be viewed using a computer, such as a personal computer. If a computer is used to view the images, the digital camera may be connected directly to the computer using a RS-232 or USB connection. Alternatively, the digital storage medium containing the digital representations of the recorded images may be removed from the digital camera and inserted into an input/output ("I/O") device capable of reading the contents of the medium and communicating such contents to the computer. Once the digital representations of the recorded images are communicated to the computer, the images are viewable and printable using software programs known to those skilled in the art. Notably, the advantage of using a digital camera to record images is the camera's ability to allow the user to view recorded images without the need to process exposed film, as is necessary with traditional cameras.

Digital cameras are typically capable of maintaining a representation of time using a built-in real time clock. In addition to recording a digital representation of the image, digital cameras also record the digital camera's representation of the time when the image is recorded. More specifically, the digital camera records the representation of the time at the time when the image is recorded to the storage medium. The recording time may be delayed from the time the image was actually taken, i.e., the time the user initiates recording of the image such as, for example, pressing the shutter release button. This can occur because of processing delays associated with formatting the image for recording on the digital storage medium.

Most digital cameras create PC-compatible file systems and have built in real time clocks, and usually store the image acquisition time as a standard attribute of the PC file, and as metadata in standard image file tags. The accuracy of the digital camera's representation of time will vary depending first on how accurately it is initially set, and second on the free running precision of the time base (oscillator).

Global positioning system ("GPS") receivers are portable electronic devices that are capable of providing and/or displaying the longitude and latitude position data of the GPS receiver as well as the precise world standard date and time. As such, a GPS receiver may be used to track the geographic location of the receiver. In addition, typical GPS receivers also have memory means for recording position and time data at periodic intervals (referred to as a "GPS log"). For example, a GPS receiver known under the brand name Garmin GPS III+ is capable of storing 1900 GPS log points at a default rate of 5 seconds per GPS epoch, which is a single representation of current location and world standard time. This translates to about 2.5 hours of continuous operation. Alternatively, to obtain longer track log time intervals, the time resolution may be reduced on the GPS receiver (e.g., recording log points at a rate of 1 minute per GPS epoch) or the GPS receiver only turned on when an image is recorded. In this regard, a person may use the GPS log to track their geographic location over a period of time, for example, a 10-hour hike in the mountains.

The recorded images may be organized visually. For example, recorded images from a place or an event may be organized together either physically, e.g., maintaining hard copies of the images together, or virtually, e.g., maintaining digitally stored images together under a file directory. Alternatively, recorded images may be organized by the time the images were recorded. For example, the images may be viewed in earliest to latest time order by organizing digital representations of recorded images in accordance with the time the image was recorded, and displaying the images accordingly. Alternatively, images may be organized and displayed in accordance with a predetermined time period, for example images recorded between 2:00 PM January 7 and 5 PM February 13. Further, recorded images may be organized by the geographic location that the images were recorded.

A problem with one or more of the above systems is the extensive nature in which the process is labor-intensive and, consequently, prone to errors. For example, in order to organize images by geography, an individual must personally review each image and make a best-guess estimate of the location of the image, based solely on their personal review and knowledge. There is, therefore, a need for the ability to correlate digitally recorded images with digitally formatted information representing the geographic location of the image recorded, accurately, reliably and without incurring substantial costs.

SUMMARY OF INVENTION

The present invention satisfies, to a great extent, the foregoing and other needs not met by existing systems. The present invention relates to a method for matching the acquisition times of images taken by a digital camera with digitally recorded geographic information (i.e., GPS track log file) to create GPS metadata associating each recorded image with the geographic location that the image was recorded.

In this regard, a GPS receiver is used to record geographic and time information during the time period that images are recorded using a digital camera. After images are recorded, the digitally recorded images are time matched to the geographic information digitally recorded by the GPS receiver. The method preferably matches the digital images to the digitally recorded geographic information using the "timestamp" of the digitally recorded image file to index into a GPS track log file organized by time. In essence, a "position-stamp" is made for the digitally recorded images by tagging them with the GPS epoch recorded closest in time to when the image was recorded. This GPS metadata may be inserted in standard image file tags or maintained in a separate file associated (for example by name) with the image file.

The method further includes determining the time offset of the free running camera clock with respect to world standard time, or universal time coordinated (UTC), recorded in the GPS log files. This determination is achieved by using an image of a UTC time display recorded with the same digital camera that is used to take the images that are to be "tagged" with a "position-stamp" of GPS metadata. Such an image file contains the actual UTC time of the image and the camera clock time in the image file "timestamp." This information is sufficient to calculate the precise offset of the camera clock time, or more importantly the offset of the timestamp of files created by the camera, with respect to UTC time. This is important because if the camera clock time offset with respect to UTC time is not known precisely, there may be large errors in the position(s) assigned to an image.

In another aspect of the invention, the time offset of a free running camera clock with respect to UTC time is determined by directly measuring the difference between the clock times digitally. In this aspect, a computer is communicating in real time with a camera so that the computer can directly read the camera's clock time. In addition, the computer is optionally configured for real time access to the UTC time over the Internet via access to www.time.gov, for example. The difference between the camera's clock time and the UTC time is recorded as a single camera clock time offset measurement. Optionally and/or if necessary, a fixed adjustment can be included to accommodate image processing time in the camera, where the image processing time may be calculated as the time between recording of the image and the time recorded in the image's "timestamp".

In yet another aspect of the invention, the error of a free running camera clock may be determined by using multiple camera clock time offset measurements recorded over time. Generally, only one camera clock time offset measurement is required if the clock in the camera is reasonably good (i.e. 10 ppm, or approximately 1 second/day). However, some camera clocks are not so good. Bad clocks can be characterized by piecewise interpolation between time reference calibration images.

The method further includes interpolating between GPS epochs (i.e. location indicators) in the GPS log file to extract a better position for an image that was taken at a time not exactly represented in the log file. This is important because most commercial GPS receivers do not have sizable position log stores, so the data can be rather sparse depending on user settings.

The present invention uses the digital camera's image "timestamp" to index into a GPS log file collected when and where the pictures were taken, to find the location of the GPS receiver at the time the image was recorded. In order for this to occur, the clock in the camera must be characterized so that each image file's "timestamp" may be accurately converted to UTC time. The present invention accomplishes this by either using UTC clock data manually entered from a recorded image of a UTC clock, or directly measuring camera clock errors to derive the exact camera clock time offset from the UTC time for each image recorded. In this way, time zone offsets, daylight savings time, and any errors in the set time and absolute accuracy of the camera's real time clock can be accounted for.

Camera clock drift can also be accommodated but is not usually required. The user interface is simple to operate minimizing the possibility of error.

A primary feature and advantage of the method for matching geographic information with recorded images is that the method is a wireless operation. No cable is required between the GPS receiver and the digital camera. Consequently, the GPS receiver can be conveniently located having a clear view of the sky without interfering with operation of the digital camera.

The method has the further advantage of compatibility with off-the-shelf, low cost, consumer-type GPS receivers. Further, only minimal interaction with the GPS receiver is required; just turn it on, take a picture of the time format screen, and take it with you wherever you take pictures.

In one embodiment of the invention, a method matches a digital representation of an image with information including a geographic location of the image. The method includes the following sequential, non-sequential and/or sequence independent steps: recording one or more images of a desired field of view; recording information that includes a geographic location of each image; creating an association of each image with a respective information; and outputting a result representing a closest pairing of each image with the respective information including a geographic location of the image.

The method also includes the steps of: matching geographic location information with each digital representation of the image in a wireless operation; pairing each image with geographic location information substantially corresponding to the image despite an error in geographic position recorded or time recorded when the image was recorded; position tagging each image with a location indicator closest in time to when the image was recorded; time matching each image to geographic location information recorded by a positioning device; and interpolating between one or more location indicators in a location indicator file in order to obtain the best location information for an image taken at a time not represented in the location indicator file.

In accordance with another embodiment of the invention, one or more electronic devices includes a data processor that performs the steps of: recording one or more images; recording geographic data substantially corresponding to each image; position tagging each image with a location indicator substantially closest in time to when each image was recorded; matching a time of recording of each image with a location indicator substantially recorded closest in time to when each image was recorded, in order to determine a geographic location of an electronic positioning device at a time or closest in time to when each image was recorded; and outputting a matched result.

According to another embodiment of the invention, a method for use with a geographic positioning receiver and a digital image recording device for matching geographic information recorded by the geographic positioning receiver with images recorded by the digital image recording device, is disclosed. The method includes the steps of: recording geographic information during a time that an image is recorded; determining a first time that at least one digital image was recorded by the digital imaging recording device; determining the geographic information recorded by the geographic positioning receiver at the first time; and automatically matching the geographic information recorded at the first time with the image recorded at the first time.

The method also includes the steps of: determining an offset time between the first time that at least one digital image was recorded and the time geographic information was recorded; and synchronizing the image recording device's clock data with the receiver's clock data.

With these and other features and advantages of the present invention that may become hereinafter apparent, the nature of the invention may be more clearly understood by reference to the following detailed description of the invention, the appended claims and to the several drawings attached herein.

BRIEF DESCRIPTION OF EMBODIMENTS

DETAILED DESCRIPTION OF EMBODIMENTS

Figure 1:
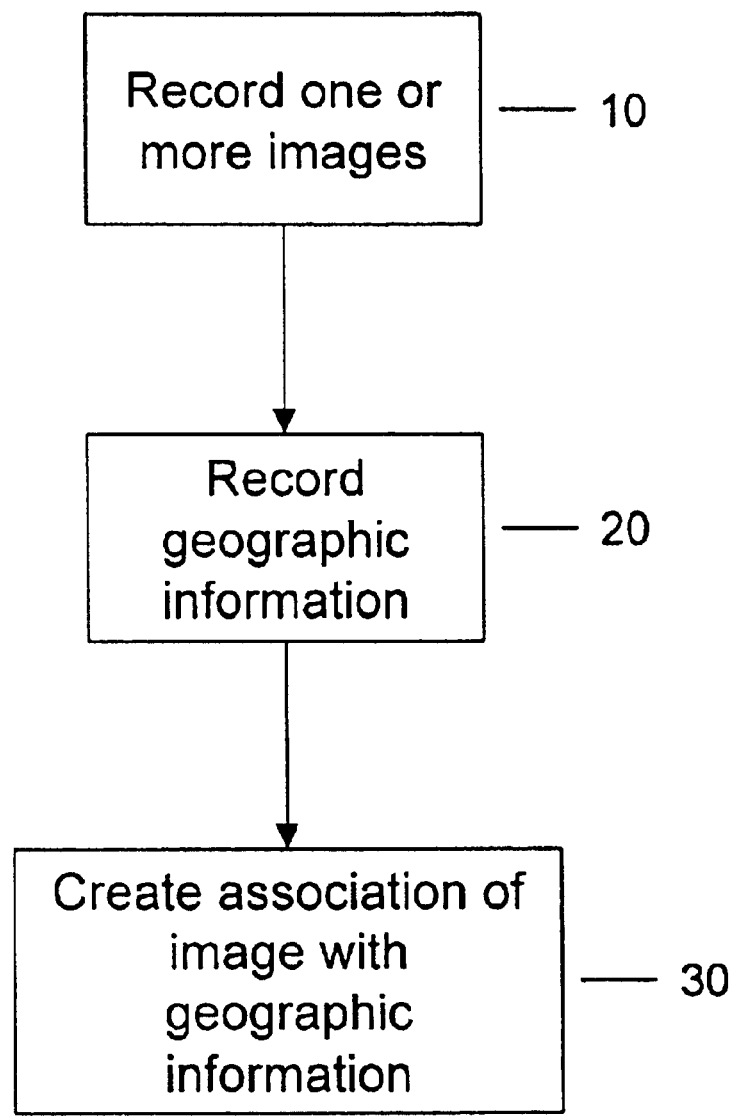
FIG. 1 is a flow chart of the overall decision logic for automatically matching images with its geographic information, in accordance with a preferred embodiment of the present invention.

The present invention relates to a method for automatically matching recorded images with geographic information corresponding to the geographic location that the image was recorded. Referring now to the figures, wherein like reference numerals indicate like elements/steps, in FIG. 1, there is a shown a flow chart of the decision logic describing a process for automatically matching images with its geographic information, in accordance with a preferred embodiment of the present invention.

As depicted, there are three major phases of the method. At step 10, a digital image recording device, such as a digital camera or digital camcorder, is used to record one or more images. At the time an image is recorded, a GPS receiver is used to collect geographic information preferably corresponding to the image, as at step 20. For example, a user may use a digital camera to record images during a vacation. The GPS receiver may be a commercially available GPS receiver or may be incorporated into the digital image recording device. In this regard, the user would also use a GPS receiver to collect geographic information in a GPS log during the time periods that images are recorded. At step 30, GPS metadata files are created that associate a digital image with information concerning the geographic location of the image that was recorded. In this regard, the user would use computer means and software to automatically associate the images recorded with information from the GPS log.

Figure 2:
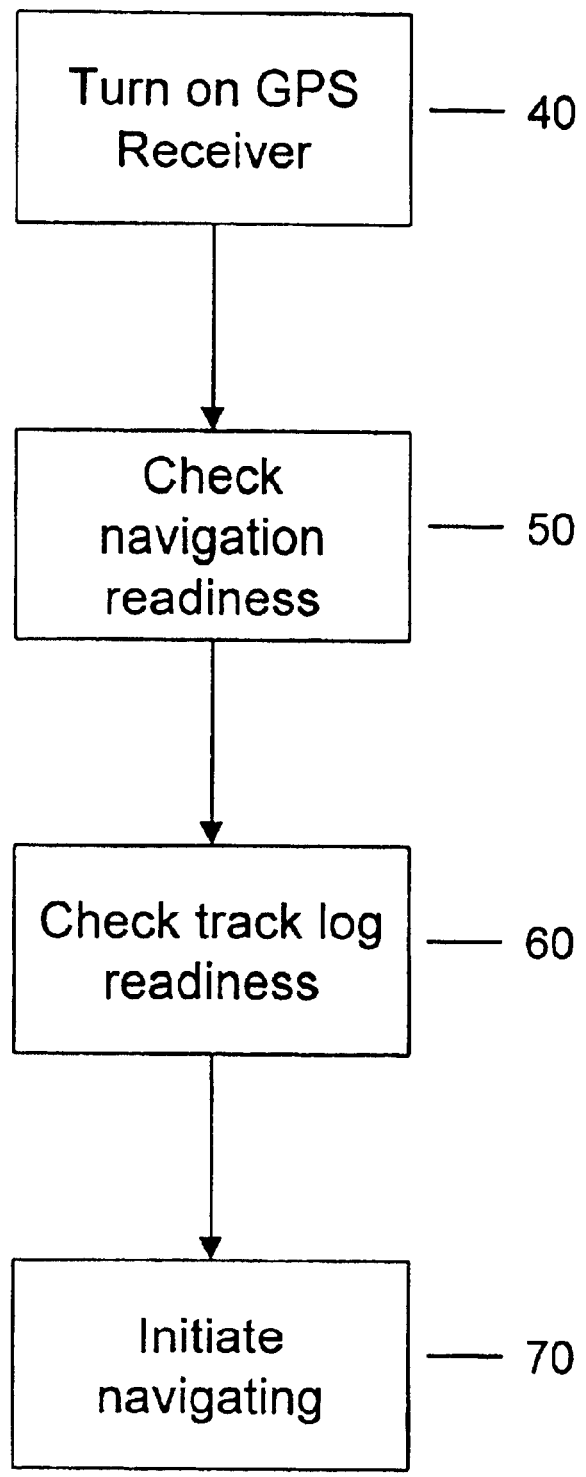
FIG. 2 is a flow chart describing in more detail an exemplary step of recording geographic information, as shown in FIG. 1.

With reference to FIG. 2, there is shown a flow chart describing in more detail an exemplary step of recording geographic information, as shown in FIG. 1. One aspect of the invention includes setting up a GPS receiver to record geographic information when images are recorded. When a user "takes pictures" (i.e., records images) of a desired field of view, the GPS receiver must be turned on (step 40) and navigating. As described herein, navigating refers to the active state of the GPS receiver receiving data from three or more GPS satellites and calculating longitude/latitude and time information corresponding to the current geographic location of the GPS receiver, and hence, the image recording device. In order to navigate, the GPS receiver's antenna should have a clear view of the sky. The GPS receiver's display should indicate that the GPS receiver is navigating. So a check for navigation readiness of the GPS receiver is appropriate (step 42).

In addition, the user should confirm that the GPS track log has not filled up (step 60). This is usually indicated by the "percent used" notation in the track log menu of the GPS receiver. Preferably, the GPS receiver should be set to create a GPS log, and the log should be set to "fill," with a time or spatial logging resolution appropriate to the accuracy requirements of the user. As a consequence of all system checks being acceptably cleared, the user may initiate navigating at step 70, so that the GPS receiver may store geographic information for use in later processing. For example, when a "new roll" (i.e., a new series) of images is started, the GPS track log file in the GPS receiver is cleared and geographic information is recorded during the time period that images are recorded.

Figure 3:
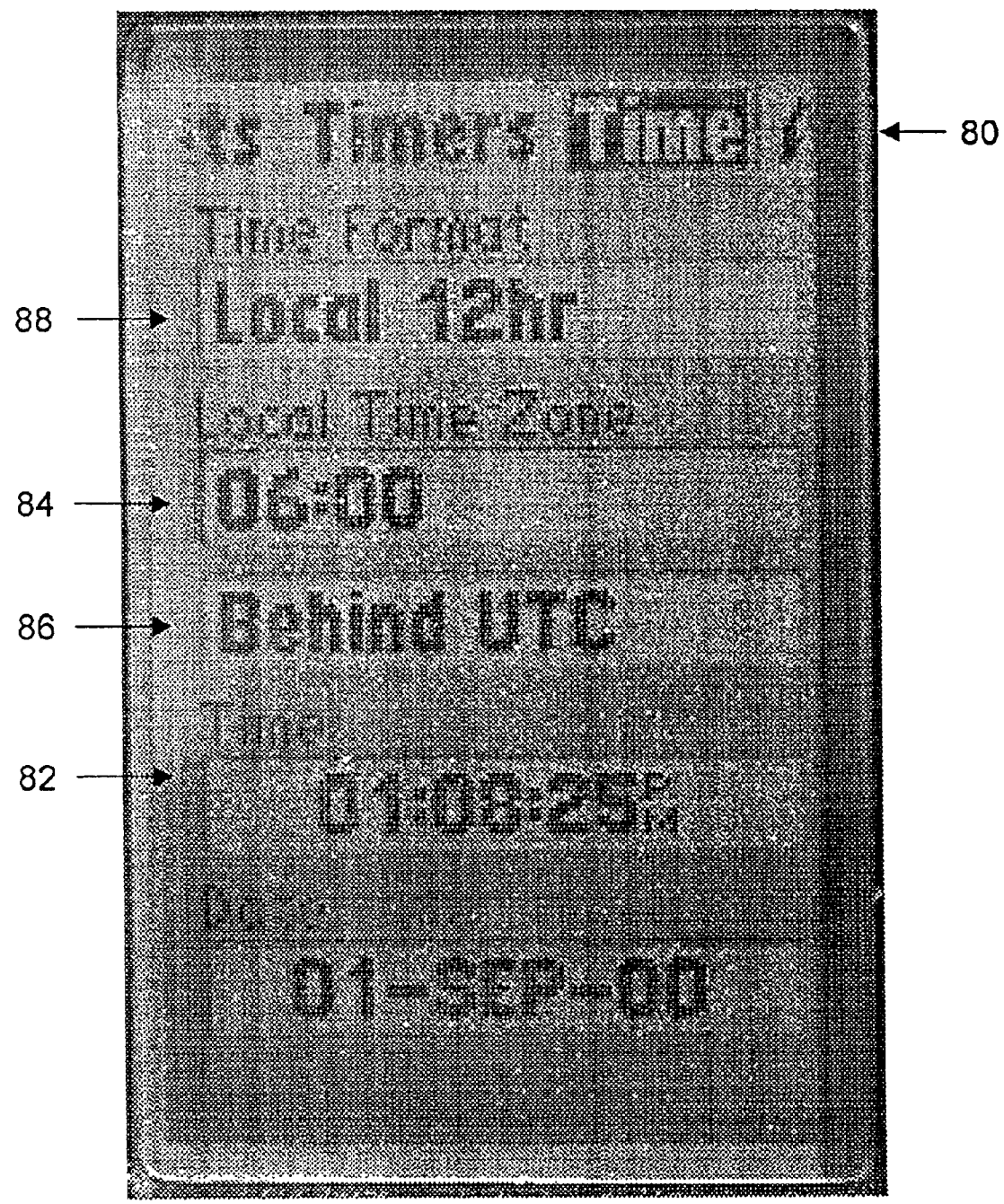
FIG. 3 is an illustration of a time display screen of the receiver.

Preferably, with reference to FIG. 3, an image of the GPS receiver's UTC time display screen 80 (accessed from the setup menu) is one of the images recorded. As described in more detail below, this image, which is referred to as the calibration image 80, contains all the information required to calculate the exact offset between the camera's clock time and the world standard UTC time. All the information, when the clock is displaying local time 82, comprises the time 84 in the local time zone, the daylight savings time 88, or the absolute offset 86 from the UTC time. Careful attention should be paid to making sure the image is in focus and that the GPS receiver is navigating; that is, that the receiver has a GPS location "fix" at the time of imaging and, as a result, is displaying time received directly from the GPS system clock. Otherwise, the time as displayed on the GPS receiver will run free and may not be synchronized with the world standard UTC time.

Once images and geographic information are recorded, GPS metadata files are automatically created that associate a digital image with information concerning the geographic location of the image that was recorded, using a computer and software. An exemplary embodiment describing how an association of an image with its geographic information is created, is shown in FIG. 4.

Figure 4:
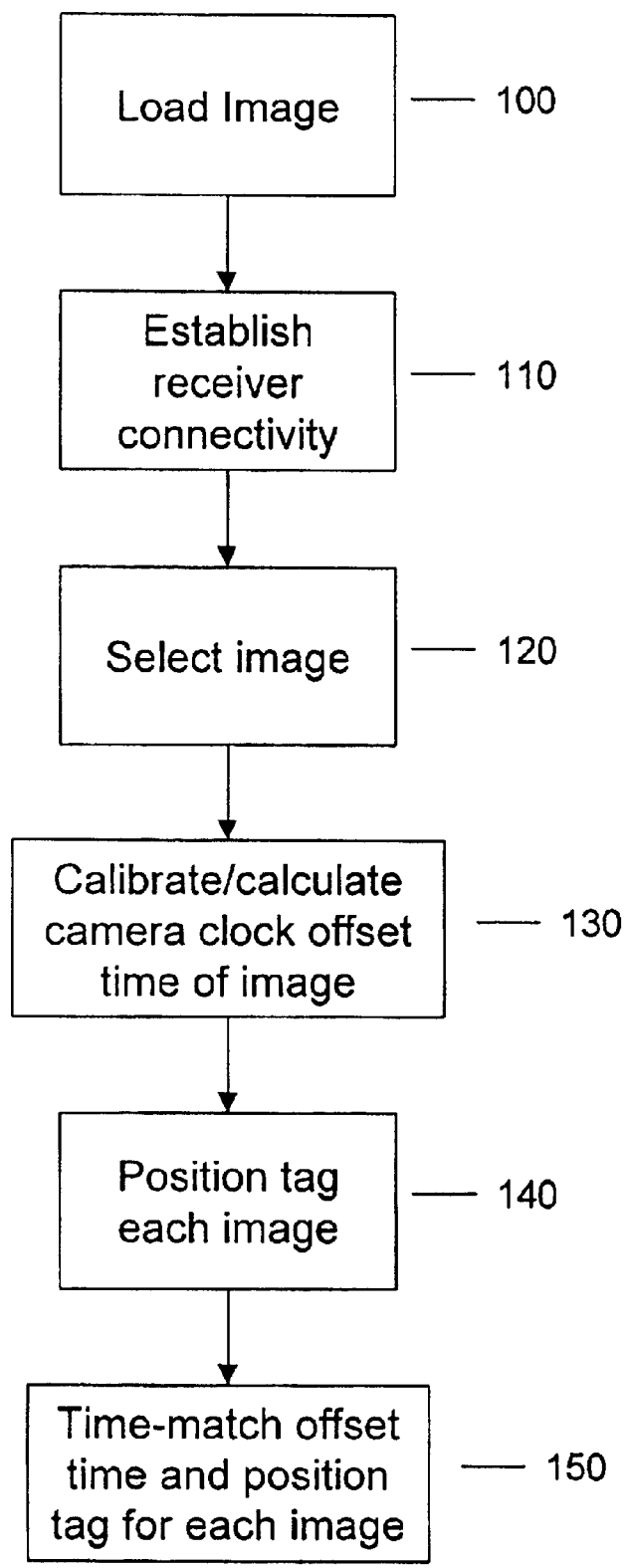
FIG. 4 is a flow chart describing in more detail an exemplary step of creating an association of an image with its geographic information, as shown in FIG. 1.

Referencing FIG. 4, a file system containing one or more images is mounted or loaded by putting a memory card containing each image from the camera into a computer, or by connecting the camera to the computer using a USB port or the like, at step 100. Next, at step 110, the GPS receiver is connected to one of the COM ports on a computer using a suitable cable, and the GPS receiver is turned on. Next, at step 120, the directory is selected containing the images and the camera clock time offset is calibrated at step 130.

The problem of accurate camera clock time offset calibration/measurement should not be underestimated. In some cases the solution may be as simple as setting the clock on the camera to match the UTC time. In other cases, a solution may not be possible or is wrought with user input errors. User input errors may result primarily from local time and daylight savings time offset calculations, 12 hour vs. 24 hour modes, setting AM or PM incorrectly, or forgetting to re-set the clock if it has gained or lost time, and so forth.

Additionally, some digital cameras manifest delays from the point in time when data, including image data, is captured to when the real time for the data collection event is captured (i.e., when the image is written to a file). Another problem is that it may not be possible to set the "seconds" field of some real time clocks in some digital cameras, even though seconds are maintained as an attribute of the data captured.

In one aspect of the invention, one unique solution to the problem is to use a picture of the GPS time display in calculating the time offset of the camera clock and the UTC time, after the fact. That is, after the image data is collected, an offset between the camera's clock time and the UTC time is calculated using clock data from the image of a UTC time display screen. This image, preferably embodied in an image file, contains the actual UTC time of the image as well as the camera's clock time. The camera's clock time is preferably contained as a "timestamp" in an image file. This information is not only sufficient to calculate the precise offset of the camera's clock time, but more importantly, the offset of the time each image was created by the camera with respect to the UTC time.

This is important, for example, because it eliminates the negative impacts brought on by an error in position assigned to an image when the camera's clock time offset with respect to the UTC time is not precisely known. As a practical matter, it is not necessary for the user to set precisely the clock's time in the camera, or for it to have been exactly correct when the images were taken. The clock in the camera can be set to local time, or not even be set at all, as long as it runs. In addition, any data acquisition time delays are automatically accounted for, and the time resolution, as an attribute of the image file, is as good as the resolution of the time recorded.

In another aspect of the invention, the camera clock time offset, and consequently the time recorded in each image's "timestamp", is calibrated by directly measuring (digitally) the difference between a free-running camera clock and the UTC time. In this aspect, a computer is communicating in real time with a digital camera so that the computer can directly read the camera's clock time. In addition, the computer is preferably configured for real time access to the UTC time, such as via the internet (e.g. www.time.gov). The difference between the camera's clock time and the UTC time is recorded/measured as a single camera clock time offset. If necessary, a fixed adjustment may be included to accommodate image processing time in the camera. The fixed adjustment may represent, for example, the time between actual recording of an image and the time recorded in the image's "timestamp".

In yet another aspect of the invention, multiple camera clock time offset measurements recorded over time, are used to calculate the camera clock offset drift. This strategy makes sense in instances when camera clocks operate unreliably, for example, by gaining or losing more than 1 second per day. The idea here is to record, over a period of time, several measurements of the clock's time offset and interpolate between the offset times for each of the "timestamps" in order to extract a more precise representation of the camera clock time offset at the time the image was taken.

Another strategy for calculating clock time offset when the camera clock operates unreliably is to create a calibration image where the time displayed in the "time offset calibration image" may be interpreted and entered as data into the program. The calibration image may contain the actual UTC time as displayed on a UTC clock, such as the time presented on the web site www.time.gov. Or the calibration image may contain a picture of a local time display synchronized to the UTC time, such as the UTC time presented on the display of a GPS receiver. Hence, the user can create a calibration image by simply taking a picture of the display of the GPS receiver being used to capture the position (track) log. Calibration images can be recorded anytime—before, during, or after subject pictures are taken. Recording calibration images frequently allows for better characterization of a bad camera clock scenario.

Referring now to FIG. 4, once the offset of the time recorded in the image's "timestamp", with respect to the UTC time, is determined (step 130), a "position-stamp" is generated or made for each image, at step 140. A "position-stamp" is made for each digitally recorded image by tagging each image with a GPS epoch (i.e. location indicator) recorded closest in time to when the image was recorded.

In one embodiment, each GPS epoch or metadata is maintained in a separate file associated, for example, by name with the corresponding image file. The camera's image's "timestamp" is then cross-referenced with the GPS metadata contained in the GPS track log file, preferably organized by time, in order to find a location of the GPS receiver at the time or closest in time to when the image was recorded. Consequently, each image is time-matched to the geographic information recorded by the GPS receiver, at step 150. Alternatively and optionally, each GPS epoch or metadata may be inserted into each image file as a standard image file tag.

Figure 5:
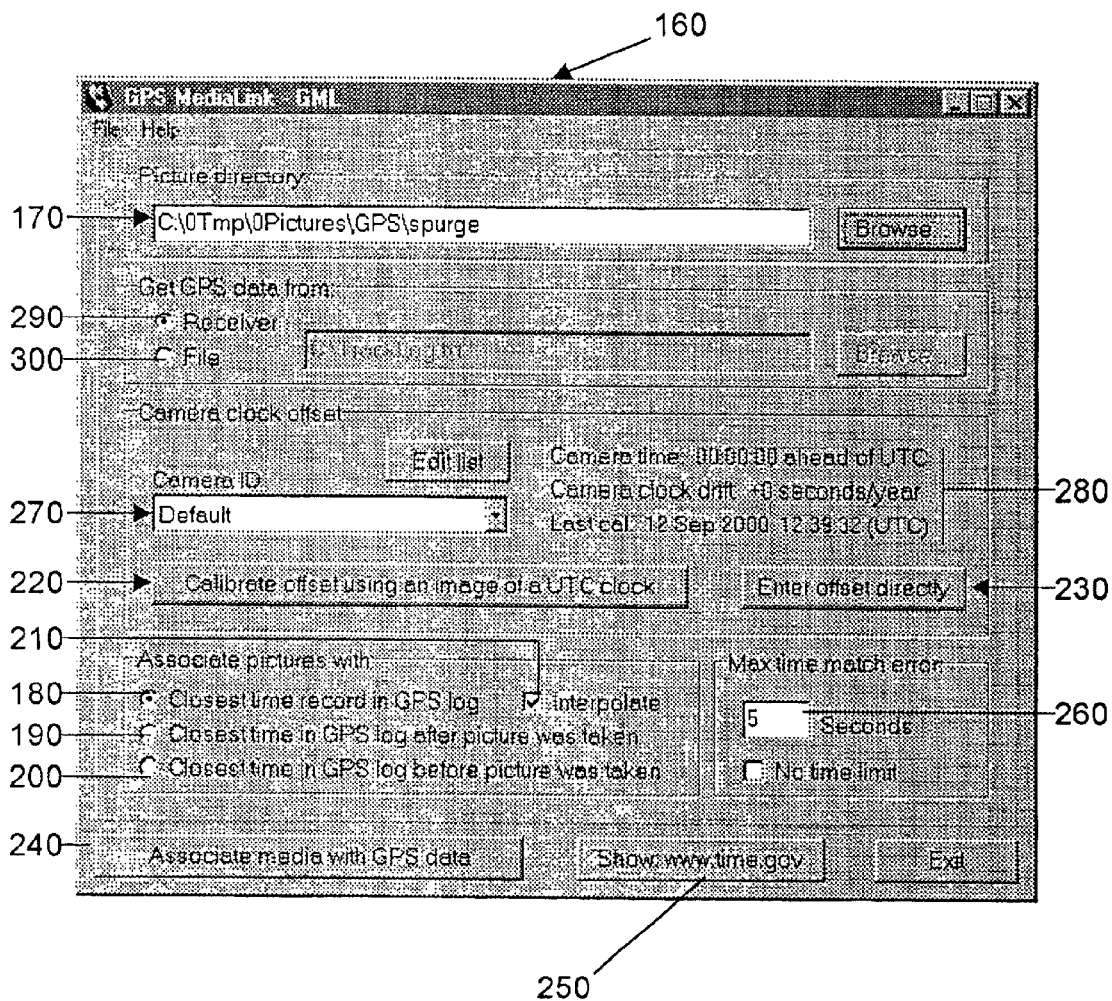
FIG. 5 shows an exemplary screen shot of the GPS display screen.

FIG. 5 shows an exemplary screen shot of the GPS display screen 160 and the various user options. As depicted and discussed above, a user may select the appropriate directory containing the images by entering that information in the directory box 170. Images selected may also be associated as desired.

For instance, by clicking on the appropriate circle 180, 190, 200, a user may associate one or more images either with the closest time recorded in the GPS log, the closest time in the GPS log after the picture was taken, or with the closest time in the GPS log before the picture was taken, respectively. Note that a click on the picture association circle 180, serves to automatically check the interpolate box 210, which triggers the process of interpolating between the GPS epochs in the GPS log file. Recall that a feature of interpolation is to extract a better location information for an image that was taken at a time not exactly represented in the log file.

Other features of the display screen 160 include a calibration button 220, which provides calibration after using an image of the GPS clock; the ability to enter the offset directly via the offset button 230; another association button 240, which provides for associating media with GPS data; a UTC time button 250; a time box 260, which displays the number of seconds elapsed in matching time errors; and a camera ID box 270.

Display screen 160 also shows camera clock characteristics in the area 280. These characteristics include the camera time with respect to the UTC time; camera clock drift (in seconds per year); and the last calibration date and time (in UTC time). In addition, display screen 160 provides two options 290, 300 for retrieving GPS data. More specifically, GPS data is retrievable from the receiver via a receiver option 290, and from a file via file option 300.

As previously discussed, it is important to note that in order for an image to be matched with a respective geographic information, the clock in the digital camera must be characterized so that each image's "timestamp" may be accurately converted to the UTC time. In one embodiment of the present invention, this conversion is accomplished in part by employing UTC clock data that is entered manually from a recorded image of a UTC clock.

In one or more other embodiments, conversion of the image's "timestamp" to the UTC time may be accomplished in part by directly measuring camera clock errors to derive an exact camera clock time offset from the UTC time for each image recorded. Measurement may also take place on a real time basis. In this way, any errors and/or discrepancies in the set time and accuracy of the camera's clock, such as, for example, time zone offsets, daylight savings time and the like, may be accounted for.

Alternatively and optionally, to avoid the conversion, one may use an image of a UTC clock, such as one from the time.gov site, or an image of the GPS receiver screen, as opposed to a display of a local clock. In this instance, a local clock is best defined as one that is synchronized with the UTC time, but displays local time instead of the UTC time, which is offset by a time zone and daylight savings. A local clock that is synchronized to the UTC time is also accessible via the time.gov site or on a GPS screen.

The present invention herein described for time matching GPS data logs with other data collected, including image data, for the purpose of spatially mapping the collected data, is a marked departure from traditional image/geographic mapping. The present invention also depends on two factors. First, that the real time of the data acquisition be recorded along with the data acquired. And second, that there be a method of accurately determining the offset between the data logging clock and the UTC time.

A primary advantage of the time matching method herein described is its wireless functionality; a wireless operation can be implemented without the need for real time communication of information between the GPS receiver and the image recording device, which may or may not be integrally constructed. Therefore no information transmitters, receivers, special interfaces, or power supplies are required, and a greater selection of off-the-shelf standard equipment may be utilized as system components.

The foregoing description of the present invention has been presented for purposes of illustration and description. The description is not intended to limit the invention to the form disclosed herein and the claims appended hereto. For example, instead of using a GPS log file, a user-definable geographic location system, where a user provides or "drops" location markers when an image is taken, may be used. It is important, however, that time information also accompanies each location marker. In addition, the present invention is applicable to continuous path video where multiple epochs are associated with a video recording by time code. In this case, each video frame could have an associated GPS location (by interpolation). Consequently, the invention and modifications commensurate with the above teachings and skill and knowledge of the relevant art are within the scope of the present invention. It is intended that the description and the appended claims be construed to include all alternative embodiments as permitted by the prior art.

What is claimed is:

1. A method for use with a geographic positioning receiver and a digital image recording device for matching geographic information recorded by the geographic positioning receiver with images recorded by the digital image recording device, said method comprising the steps of:
   recording geographic information during the time that an image is recorded;
   determining a first time that at least one digital image was recorded by the digital image recording device;
   determining a second time that at least one geographic information was recorded by the geographic positioning receiver;
   determining the geographic information recorded by the geographic positioning receiver at the first time by matching the second time with the first time; and
   automatically matching the geographic information recorded at the second time with the image recorded at the first time.

2. The method of claim 1, wherein said digital image recording device automatically records a first relative time when said digital image recording device records an image, wherein said step of determining a first time, further includes a step of determining a time stamp for an image recorded by the digital image recording device.

3. The method of claim 1, further comprising the step of:
   determining a time offset between the first time that at least one digital image was recorded and the time geographic information was recorded.

4. The method of claim 3, wherein the geographic positioning receiver includes a visual display indicating the relative time being tracked by the geographic positioning receiver;
   wherein said step of determining a time offset, further includes a step of using the digital image recording device to record an image of the visual display of the geographic positioning receiver.

5. The method of claim 3, wherein said step of determining a time offset, further includes a step of using an image of a UTC display recorded with the image recording device.

6. The method of claim 3, wherein said step of determining a time offset, further includes a step of using at least one image recorded using the digital image recording device.

7. The method of claim 3, wherein said step of determining a time offset, further includes a step of interpolating between GPS epochs in the OPS log file.

8. The method of claim 1 further comprising the step of:
   synchronizing the image recording device's clock data with the GPS receiver's clock data.

9. A method for matching a digital representation of an image with information including a geographic location of said image, the method comprising the steps of:
   (a) recording one or more images of a desired field of view at a first time using a digital image recorder having a clock;
   (b) recording information including a geographic location of said one or more images at a second relative time using a geographic positioning receiver having a
   (c) creating an association of each said one or more images at a third relative time with a respective said information including a geographic location of said one or more images by matching the second relative time with the first time; and
   (d) outputting a result representing a closest pairing of each said one or more images with a respective said information including a geographic location of said one or more images.

10. The method according to claim 9, further including the step of matching geographic location information with each digital representation of an image in a wireless operation.

11. The method according to claim 9, wherein said information further includes longitude and latitude information corresponding to a current geographic location of a positioning device.

12. The method according to claim 9, wherein said information further includes time information corresponding to a current geographic location of a positioning device.

13. The method according to claim 9, wherein the step of creating an association, further includes a step of associating each said one or more images with at least one of a closest recording time, a closest recorded time before said one or more images were taken, and a closest time after said one or more images were taken.

14. The method according to claim 9, wherein the step of creating an association, further includes a step of at least one of calibrating and calculating a time offset of an image recording device used to record said one or more images.

15. The method according to claim 14, wherein said step of at least one of calibrating and calculating, further includes a step of setting the image recording device's clock to match a world standard time.

16. The method according to claim 14, wherein said step of at least one of calibrating and calculating, further includes a step of determining an offset of the image recording device's clock time.

17. The method according to claim 14, wherein said step of at least one of calibrating and calculating, further includes a step of determining an offset of the time each image was created with respect to a world standard time.

18. The method according to claim 14, wherein said step of at least one of calibrating and calculating, further includes a step of directly measuring a difference between a free-running clock of an image recording device and a world standard time.

19. The method according to claim 14, wherein said step of at least one of calibrating and calculating, further includes a step of recording, over time, multiple measurements of an image recording device's clock time offset.

20. The method according to claim 14, wherein said step of at least one of calibrating and calculating, further includes a step of creating a calibration image.

21. The method according to claim 14, wherein said step of at least one of calibrating and calculating, further includes a step of performing optical character recognition.

22. The method according to claim 9, further including a step of pairing an image with geographic location information substantially corresponding to said image despite an error in geographic position recorded when said image was recorded.

23. The method according to claim 9, further including a step of pairing an image with geographic location information substantially corresponding to said image despite an error in time recorded when said image was recorded.

24. The method according to claim 9, further including a step of position tagging each image with a location indicator closest in time to when said image was recorded.

25. The method according to claim 24, wherein said location indicator is at least one of maintained in a separate file associated with a corresponding image file and configured for insertion into each image file.

26. The method according to claim 9, further including a step of time matching each image to geographic location information recorded by a positioning device.

27. The method according to claim 9, further including a step of interpolating between one or more location indicators in a location indicator file in order to obtain a best location information for an image taken at a time not represented in said location indicator file.

28. In a method for matching a recorded image with geographic data substantially corresponding to a geographic location where said image was recorded, one or more electronic devices comprising a data processor performing the steps of:

(a) recording one or more images;

(b) recording geographic data substantially corresponding to each image;

(c) position tagging each image with a location indicator, of said geographic data, substantially closest in time to when each image was recorded; and (d) matching a time of recording of each image with said location indicator recorded substantially closest in time to when each image was recorded, in order to determine a geographic location of an electronic positioning device at a time or closest in time to when each image was recorded; and (e) outputting a matched result.

* * * * *